US011965253B2

(12) United States Patent
Raccurt et al.

(10) Patent No.: US 11,965,253 B2
(45) Date of Patent: Apr. 23, 2024

(54) METHOD FOR FORMING A LAYER OF SINGLE-PHASE OXIDE (FE, CR)$_2$O$_3$ WITH A RHOMBOHEDRAL STRUCTURE ON A STEEL OR SUPER ALLOY SUBSTRATE

(71) Applicant: MANNESMANN PRECISION TUBES FRANCE, Saint-Florentin (FR)

(72) Inventors: Olivier Raccurt, Grenoble (FR); Jean-Marie Gentzbittel, Grenoble (FR); Olivier Sicardy, Grenoble (FR); Francis Bourguignon, Vitry-le-Francois (FR); Pierre-Jean Marchais, Vitry-le-Francois (FR)

(73) Assignee: MANNESMANN PRECISION TUBES FRANCE, Saint-Florentin (FR)

( * ) Notice: Subject to any disclaimer, the term of this patent is extended or adjusted under 35 U.S.C. 154(b) by 892 days.

(21) Appl. No.: 16/980,702

(22) PCT Filed: Mar. 15, 2019

(86) PCT No.: PCT/FR2019/050583
§ 371 (c)(1),
(2) Date: Sep. 14, 2020

(87) PCT Pub. No.: WO2019/186024
PCT Pub. Date: Oct. 3, 2019

(65) Prior Publication Data
US 2021/0010125 A1 Jan. 14, 2021

(30) Foreign Application Priority Data
Mar. 15, 2018 (FR) ...................................... 1852240

(51) Int. Cl.
| C23C 8/14 | (2006.01) |
| C22C 19/03 | (2006.01) |
| C22C 19/07 | (2006.01) |
| C22C 38/18 | (2006.01) |
| C23C 8/02 | (2006.01) |
| C23C 8/18 | (2006.01) |
| C23C 8/80 | (2006.01) |
| F24S 20/20 | (2018.01) |
| F24S 70/20 | (2018.01) |

(52) U.S. Cl.
CPC ................ *C23C 8/14* (2013.01); *C22C 19/03* (2013.01); *C22C 19/07* (2013.01); *C22C 38/18* (2013.01); *C23C 8/02* (2013.01); *C23C 8/18* (2013.01); *C23C 8/80* (2013.01); *F24S 20/20* (2018.05); *F24S 70/20* (2018.05)

(58) Field of Classification Search
CPC ......... C22C 19/03; C22C 19/07; C22C 38/18; C23C 8/14; C23C 8/02; C23C 8/18; C23C 8/80; F24S 20/20; F24S 70/20
See application file for complete search history.

(56) References Cited

U.S. PATENT DOCUMENTS

| 9,551,507 B2 * | 1/2017 | Fleury ..................... F24S 70/25 |
| 2011/0249326 A1 | 10/2011 | Villuendas Yuste et al. |
| 2014/0090639 A1 | 4/2014 | Fleury et al. |
| 2015/0267303 A1 | 9/2015 | Villuendas Yuste et al. |
| 2016/0363349 A1 | 12/2016 | Fleury et al. |

FOREIGN PATENT DOCUMENTS

| EP | 2 341 038 A1 | 7/2011 |
| EP | 2 784 172 A1 | 10/2014 |
| FR | 2 976 349 A1 | 12/2012 |
| WO | WO 2015/087021 A1 | 6/2015 |

OTHER PUBLICATIONS

International Search Report dated Oct. 4, 2019 in PCT/FR2019/050583 filed on Mar. 15, 2019, 2 pages.
French Preliminary Search Report dated Nov. 26, 2018 in French Application 1852240 filed on Mar. 15, 2018, 1 page.
Greeff, A. P. et al., "The oxidation of industrial FeCrMo steel," Corrosion Science, vol. 42, 2000, pp. 1725-1740.
Sharma, V. C., "A Comparison of Thermal Performance of Austenitic Stainless Steel Solar Absorber Plates Coloured by Chemical and Thermal Oxidation Techniques," Energy, vol. 6, No. 2-C, 1981, pp. 133-138.
Karlsson, B. et al., "Optical constants and spectral selectivity of stainless steel and its oxides," Journal of Applied Physics, vol. 53, No. 9, 1982, pp. 6340-6346, 8 total pages.
Xia, Z. X. et al., "Improve oxidation resistance at high temperature by nanocrystalline surface layer," Scientific Reports, vol. 5:13027, 2015, pp. 1-7.
Kennedy, C. E., "Review of Mid- to High-Temperature Solar Selective Absorber Materials," NREL/TP-520-31267, 2002, pp. 1-52, 58 total pages.
Palmer, J. M., "The Measurement of Transmission, Absorption, Emission, and Reflection," Handbook of Optics, vol. 2, Chapter 25, 44 total pages, Date: 1995.
Braillon, J. et al., "Development of Optical Tool for the Characterization of Selective Solar Absorber Tubes," AIP Conf. Proc., vol. 1734, 2016, pp. 130004-1-130004-7, 8 total pages.

(Continued)

*Primary Examiner* — Michael P Wieczorek
(74) *Attorney, Agent, or Firm* — Oblon, McClelland, Maier & Neustadt, L.L.P.

(57) ABSTRACT

A method for forming a layer of single-phase oxide (Fe, Cr)$_2$O$_3$ with a rhombohedral structure on a steel or super alloy substrate, may include, successively: (a) supplying a steel or super alloy substrate covered with a surface layer, the steel including at least 2 wt.-% chromium; (b) removing the surface layer in an atmosphere containing at least 0.2 atm O$_2$, creating a level of micro-deformation in the crystal lattice of the steel or super alloy that is greater than $1.0 \cdot 10^{-3}$, and a heating at a heating rate higher than 400° C./s, such as to form a layer of rhombohedral oxide (30) (Fe, Cr)$_2$O$_3$; and (c) carrying out a thermal treatment, in the presence of air, at a water partial pressure of less than 10.000 ppm, and at a temperature varying in a range of from 400 to 1000° C., such as to grow the layer of rhombohedral oxide formed in the removing (b) to a thickness in a range of from 70 to 150 nm.

21 Claims, 5 Drawing Sheets

(56) References Cited

OTHER PUBLICATIONS

Raccurt, O. et al., "Study of the stability of a selective solar absorber coating under air and high temperature conditions," Energy Procedia, vol. 69, 2015, pp. 1551-1557.

Raccurt, O. et al., "In Air Durability Study of Solar Selective Coating for Parabolic Trough Technology," AIP Conf. Proc., vol. 1850, 2017, pp. 130010-1-130010-8, 9 total pages.

* cited by examiner

METHOD FOR FORMING A LAYER OF SINGLE-PHASE OXIDE (FE, CR)$_2$O$_3$ WITH A RHOMBOHEDRAL STRUCTURE ON A STEEL OR SUPER ALLOY SUBSTRATE

CROSS-REFERENCE TO RELATED APPLICATIONS

The present application is the national stage of international application PCT/FR2019/050583, filed on Mar. 15, 2019, and claims the benefit of the filing date of French Appl. No. 1852240, filed on Mar. 15, 2018.

TECHNICAL FIELD AND STATE OF PRIOR ART

This invention relates to a method for forming a layer of single-phase oxide (Fe, Cr)$_2$O$_3$ with a rhombohedral structure on a steel or super alloy substrate.

Applications of the invention are found particularly in the field of solar thermal absorbers for Concentrating Solar Power Plants (CSPs).

A concentrating solar power plant is a power plant designed to concentrate sun rays using mirrors to heat a heat transporting fluid. The heat transporting fluid then acts as a heat source in a thermodynamic cycle in order to produce electricity or for direct use of this heat source. The concentration of sun rays makes it possible to reach higher temperatures and to benefit from a high thermodynamic conversion.

One of the essential elements of a concentrating solar power plant is the solar radiation absorber element that has the function of absorbing incident solar radiation to convert it into heat. In order to maximise the efficiency of the absorber, it generally comprises a coating, called a selective coating or selective treatment. The selective coating enables maximum absorption of incident solar energy while reemitting the least possible infrared radiation (black body principle). In particular, such a selective coating is considered to be perfect if it absorbs all wavelengths shorter than a cutoff wavelength and reflects all wavelengths longer than this same cutoff wavelength.

Classically, the selective coating is obtained by depositing a metallic layer acting as an infrared reflector, then one or several ceramic/metal (cermet) layers as absorber, and finally one or several antireflection layers. However, these layers are generally obtained by vacuum deposition, which is a relatively expensive deposition technique, which increases the manufacturing costs of the solar absorber. Furthermore, these materials do not have good resistance to oxidation under air at high temperature, which limits their use under air at temperatures of the order of (~300° C.) or use under a vacuum. In general, deposition methods can be used to obtain layers that have the required optical properties but not necessarily temperature stability nor a protective nature with regard to the substrate.

Another solution consists of using a substrate made of steel containing chromium and oxidising it so as to form an intrinsically selective oxide layer, in other words the oxide layer is capable of absorbing a maximum of incident solar energy and reemitting a minimum of infrared radiation. Absorbing a maximum of energy means that the thin surface layer can absorb at least 75% of the solar radiation. Reemitting a minimum of infrared radiation means that the emissivity of the thin surface layer is less than 25%. Such a layer must be a layer of single phase (Fe, Cr)$_2$O$_3$ oxide, conforming, and its thickness must be ≤150 nm. Absorption in the solar radiation range will be better as the oxide is thicker, but the emissivity of the selective treatment will increase in the infrared range. Furthermore, the layer must have good thermal stability. The stability of the oxide layer is also dependent on its thickness, and it worsens as the thickness of the layer increases.

In the article by Greef et al. ("*The oxidation of industrial FeCrMo steel*", Corrosion Science 42 (2000) 1725-1740), a study is made of the influence of different parameters, and particularly the influence of the heat treatment on the formation of the oxidation layer. The oxidation is made on an industrial FeCrMo steel at a temperature of 157° C. to 758° C., under controlled partial pressure of dioxygen. For temperatures of less than 400° C., an oxide layer is formed, comprising principally Fe$_2$O$_3$ and a small quantity of Cr$_2$O$_3$. From 400° C. to 600° C., a layer of oxide is obtained comprising a mixture of FeO, Fe$_2$O$_3$, and Cr$_2$O$_3$. For temperatures higher than 600° C., a layer of Cr$_2$O$_3$ is obtained.

Different surface preparations of the substrate can be made before the oxidation step.

For example, studies have been carried out since the 1980s on obtaining a selective optical layer to form a solar absorber by polishing and then thermal oxidation of a stainless steel. The paper by V. C Sharma et al. ("*A comparison of thermal performance of austenitic stainless steel solar absorber plates coloured by chemical and thermal oxidation techniques*", Energy Vol. 6. pp. 133-138, 1981) describes a steel rich in chromium (18/8 Cr/Ni), polished, then subjected to a heat treatment at 770° C., for 30 minutes. The best performances obtained are a solar absorbance of 84% and an emittance of 22%.

B. Karlsson et al. ("*Optical constants and spectral selectivity of stainless steel and its oxides*", J. Appl. Phys. 53(9), 6340-6346, 1982) studies the optical properties of different stainless steels, previously polished, then subjected to a heat treatment. The oxide layer obtained is a mixed oxide layer of Cr$_2$O$_3$ and Fe$_2$O$_3$.

In document WO-A-2015/087021, the solar absorber is obtained from a steel substrate with a content by mass of chromium equal to between 6% and 12.5%. Thermal oxidation, at a temperature varying from 400° C. to 900° C., is done on the previously polished or stretched substrate. The polishing step can form low roughness substrates while limiting the formation of microstrains within the substrate. The layer obtained is an iron and chromium oxide with a thickness of between 10 nm and 1000 nm, and preferably between 20 nm and 500 nm.

In document EP-A-2784172, a selective solar absorber is obtained by oxidation of a steel with a content by mass of chromium equal to between 7.5% and 14%, at between 500° C. and 1150° C. The substrate can be cold rolled or cold stretched before the oxidation step. The oxide formed contains Cr$_2$O$_3$ and spinel type oxides. Lower temperature conditions are also proposed, but it is specified that in this case the formation of Fe$_2$O$_3$ oxide is preferred to the detriment of Cr$_2$O$_3$. However, the oxide obtained is different from the oxide searched for and therefore the optical and/or thermal stability performances are also different.

The steel substrate can also be prepared by a Surface Mechanical Attrition Treatment (SMAT) method. This method consists of sending balls onto the surface of the substrate with an extremely high mechanical energy, to destructure the intrinsic structure of the substrate over a depth of several hundred microns. During implementation of the SMAT method, the temperature of the substrate remains relatively close to the operating temperature. Performing a heat treatment under air, on a substrate thus prepared, leads to the formation of a chromium rich oxide layer. The presence of a large number of defects in the substrate structure is conducive to the migration of chromium during the oxidation heat treatment. However, the layer formed has a nanocrystalline structure due to the high level of mechanical strains introduced into the structure of the substrate itself, and an important variation of the structure is observed. The oxide layers formed are very specific to the SMAT method. In general, the first thing observed is generally the appearance of a bi-layer ($Fe_3O_4$/$FeCr_2O_4$) that then transforms over the heat treatment time into a tri-layer $Fe_3O_4$/$FeCr_2O_4$/$(Fe,Cr)_2O_3$ with a total thickness of more than a micron, as described in the article by Xia et al. ("*Improve oxidation resistance at high temperature by nanocrystalline surface layer*", Scientific Reports, 5:13027, DOI: 10.1038/srep13027, 2015).

Oxidation methods conventionally used in prior art generally lead to thicker oxide layers (thickness more than 150 nm), made of $Cr_2O_3$ and/or polyphase layers.

However, a layer of $Cr_2O_3$, a layer of $(Fe, Cr)_3O_4$ or a polyphase (for example biphase or triphase) oxide containing a rhombohedral $(Fe, Cr)_2O_3$ phase cannot give all the required properties. The only way to obtain such properties is to use a single-phase layer of $(Fe, Cr)_2O_3$.

None of these documents describes a method that can be used to obtain a single-phase rhombohedral layer of $(Fe, Cr)_2O_3$ oxide, with a thickness less than or equal to 150 nm bonding to a steel substrate.

PRESENTATION OF THE INVENTION

Consequently, one purpose of this invention is to disclose a method that can be used to form an oxide layer with a controlled crystallographic structure (a single-phase $(Fe, Cr)_2O_3$) oxide and a controlled thickness (70-150 nm), on the surface of a steel or super alloy substrate.

This purpose is achieved by using a method for forming a layer of $(Fe, Cr)_2O_3$ oxide with a rhombohedral structure on a steel or super alloy substrate comprising the following successive steps:
  a) supply of a steel or super alloy substrate covered by a surface layer, the steel comprising at least 2% by weight of chromium,
  b) removal of the surface layer to reach the steel or super alloy substrate, using a subtraction step, advantageously a mechanical subtraction step, under an atmosphere containing at least 0.2 atm of dioxygen, the subtraction step generating a level of microstrains in the steel or super alloy crystalline lattice larger than $1.0 \times 10^{-3}$ and local heating at a rate of more than 400° C./s, so as to form a single-phase rhombohedral layer of oxide $(Fe, Cr)_2O_3$,
  c) performance of a heat treatment under air at a partial water pressure of less than 10,000 ppm, and at a temperature varying from 400° C. to 1000° C., so as to make the single-phase rhombohedral oxide layer formed in step b) grow to a thickness of between 70 nm and 150 nm.

The fundamental difference between the invention and prior art is in a particular substrate surface preparation step, that leads to the formation of a single-phase rhombohedral oxide layer (Fe, $Cr)_2O_3$, adhering to the steel or super alloy substrate. The heat treatment makes the oxide layer grow. The layer obtained is a thin layer (less than or equal to 150 nm). This oxide layer confers optical properties at the substrate that are interesting for the thermal solar application, with strong solar absorbance (typically more than 75%) and a low emittance (typically less than 20% at 100° C.), good resistance to oxidation and corrosion, good temperature stability at temperatures up to 600° C., under air, for concentrating thermodynamic solar power station applications, particularly for a thermal solar absorber application.

The subtraction step is a material subtractive step to expose the steel or super alloy by removing the surface layer. The surface layer may for example contain pollutants, oxides and/or carbides. This subtraction step may simultaneously lead to:
  strains on the surface of the steel or super alloy substrate and therefore lead to the creation of high mechanical stresses in the steel or the super alloy, by friction, tearing and/or shear
  a strong temperature gradient of several hundred degrees per second is generated at the material/subtraction means interface.

This step is done under an oxidising atmosphere (i.e. containing at least 0.2 atm of dioxygen), preferably under air, which makes it possible to instantaneously create a thin oxide layer. Atmosphere means a gaseous atmosphere, for example ambient air, air enriched in dioxygen, or air enriched in water vapour. The oxidising atmosphere contains at least 5% by volume of an oxygen precursor, for example, $O_2$, $H_2O$, or $O_3$.

The joint occurrence of surface strains and the temperature increase at the surface of the substrate during removal of the surface layer under an oxidising atmosphere, leads to obtaining a single-phase mixed layer of iron and chromium oxide $(Fe,Cr)_2O_3$ with a rhombohedral structure.

The oxide is single-phase, in other words it comprises at least 90% by mass of rhombohedral phase, preferably at least 95% and even more preferably 100% by mass of rhombohedral phase. The oxide does not contain other oxide layers such as the spinel form (Fe,Cr), forms rich in iron of the $Fe_xO_y$ type that occur with methods according to prior art such as polishing, SMAT, etc.

Containing 100% by mass of rhombohedral phase means that the oxide layer contains either the rhombohedral phase only, or the rhombohedral phase and a negligible quantity of one or several other phases. A quantity is said to be negligible if it cannot be detected, for example if it cannot be detected by X-ray diffraction.

Optical measurements clearly establish different properties that are systematically more selective than oxides formed according to prior art.

Advantageously, the subtraction step is followed by fast cooling (typically with a cooling gradient greater than or equal to 100° C./s over the 900° C./400° C. range) to stress the oxide formed in compression. This improves the mechanical behaviour of the oxide layer, and limits the possibilities of elements migrating within the oxide.

Step c) grows the oxide to a thickness varying from 70 nm to 150 nm. The atmosphere used for the growth heat treatment will be a dry air atmosphere or an atmosphere with a partial $H_2O$ pressure equal to between 1 ppm and 10,000 ppm.

The oxide layer formed is thin (thickness less than or equal to 150 nm), dense, continuous and conforming. It has good mechanical behaviour on the substrate, because the oxide formed is in compression.

With such a method, the chemical nature and/or the mechanical properties of the substrate are only slightly modified.

Advantageously, the subtraction step in step b) is done at a temperature from −10° C. to 400° C.

Advantageously, the subtraction step in step b) is done at a temperature from −10° C. to 100° C.

Advantageously, the water content during step b) is less than 20000 ppm, preferably less than 500 ppm, and even more preferably less than 3 ppm.

Advantageously, the level of microstrains generated in the steel or super alloy crystalline lattice in step b) is more than $1.5 \times 10^{-3}$, and preferably more than $3 \times 10^{-3}$.

Advantageously, the local heating rate during the subtraction step is between 400° C./s and 900° C./s and more advantageously between 400° C. and 800° C.

Advantageously, the heat treatment is applied for a duration of from 5 s to 2 h, and preferably from 1 minute to 60 minutes.

The heat treatment duration and temperature will be chosen by the man skilled in the art as a function of the geometry of the substrate.

Advantageously, the partial water pressure during step c) is less than 600 ppm, and preferably less than 500 ppm.

Advantageously, the thickness of the rhombohedral oxide layer obtained in step c) varies from 70 to 150 nm.

Advantageously, the percentage of chromium in the steel varies between 2 and 25% by weight, and preferably between 5 and 16% by weight.

The invention also relates to a method for fabrication of a solar absorber comprising the following steps in sequence:
  formation of a layer of single-phase oxide (Fe, Cr)$_2$O$_3$ with a rhombohedral structure on a steel or super alloy substrate according to steps a) to c) as defined in the method to form a layer of a single-phase oxide (Fe, Cr)$_2$O$_3$ with a rhombohedral structure on a steel or super alloy substrate according to the invention,
  application of an anti-reflection layer on the oxide layer.

The invention also relates to a solar absorber obtained by the previously defined method, comprising a steel or super alloy substrate covered by a layer of single-phase rhombohedral oxide (Fe, Cr)$_2$O$_3$ with a thickness of between 70 nm and 150 nm, and an anti-reflection layer, in sequence.

Advantageously, the thickness of the oxide layer is between 80 nm and 120 nm.

BRIEF DESCRIPTION OF THE DRAWINGS

This invention will be better understood after reading the following description and the appended drawings on which.

Figure 1A:
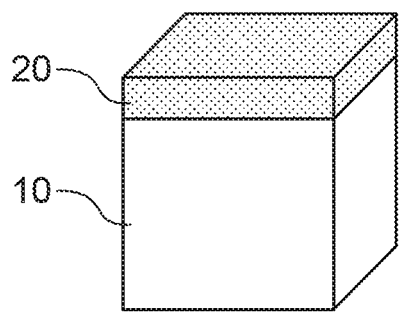
FIGS. 1A, 1B, 2 and 3 represent different steps in the method for formation of a layer of rhombohedral oxide (Fe, Cr)$_2$O$_3$, according to one embodiment of the invention.

The different parts represented on the figures are not necessarily all at the same scale, to make the figures more easily understandable.

The different possibilities (variants and embodiments) must be understood as not being mutually exclusive and possibly being combined with each other.

DETAILED PRESENTATION OF PARTICULAR EMBODIMENTS

The method for forming a layer of single-phase oxide (Fe, Cr)$_2$O$_3$ with a rhombohedral structure on a steel substrate 10 comprises the following successive steps:
  a) supply of a steel or super alloy substrate 10 covered by a surface layer 20, the steel comprising at least 2% by weight of chromium (FIGS. 1A and 1B),
  b) removal of the surface layer 20 to reach the steel or super alloy substrate 10, using a subtraction step, under an atmosphere containing at least 0.2 atm of dioxygen, the subtraction step generating a level of microstrains in the crystalline lattice of the steel more than $1.0 \times 10^{-3}$ and local heating at a rate of more than 400° C./s, so as to form a rhombohedral oxide layer 30 (Fe, Cr)$_2$O$_3$ (FIGS. 2 and 3),
  c) performance of a heat treatment under air at a partial water pressure of less than 10,000 ppm, and at a temperature varying from 400° C. to 1000° C., so as to make the rhombohedral oxide layer 30 formed in step b) grow to a thickness of between 70 nm and 150 nm.

The Substrate 10,:

The substrate 10 supplied in step a) is a steel or super alloy substrate.

The steel substrate 10 comprises at least 2% by weight of chromium.

A man skilled in the art may for example choose a very slightly alloyed, slightly alloyed or strongly alloyed steel. Preferably, the steel or the super alloy comprises from 2% to 25% by weight of chromium, and preferably from 2% to 20% by weight of chromium, and even more preferably 5 to 16% by weight.

Steels can be steels conventionally used in the energy field for example such as steels according to European standard EN10216, American standard ASTM A213, the ASME construction code or others, containing more than 2% of chromium such as 10CrMo9-10 (T22) (1.7380), 11CrMo9-10 (T22) (1.7383), 20CrMoV13-5-5 (1.7779), 7CrWVMoNb9-6 (T23) (1.8201), 7CrMoVTiB10-10 (T24) (1.7378), X11CrMo5 (T5) (1.7362), X11CrMo9-1 (T9) (1.7386), X10CrMoVNb9-1 (T91) (1.4903), X10CrWMoVNb9-2 (T92) (1.4901), X11CrMoWVNb9-1-1 (E911) (1.4905), X12CrCoWMoVNb12-2-2 (1.4915), X20CrMoV11-1 (1.4922)

The steels used can also be Cr—Ni stainless steels chosen from among standards EN10088, AISI, X7Cr13 (1.4003), X10Cr13 (1.4006), X12CrS13 (1.4005), X20Cr13 (1.4021), X30Cr13 (1.4028).

Advantageously, a nickel-based super alloy and/or a cobalt-based super alloy will be chosen. The super alloy may for example be an Inconel® type super alloy marketed by the Special Metals Corporation or an ASTM-A-494 (625) super alloy.

The substrate 10 may have many geometric shapes. For example, it can be plane, concave or convex, tubular, etc. Any form in which the surface layer 20 can be removed by material subtraction can be chosen by the expert in the field.

The part may comprise a through hole or a blind hole, a shoulder, a throat, a groove, or it may have several elementary surfaces by the association of a sphere and a cylinder, a plane and/or a cone.

Figure 1B:
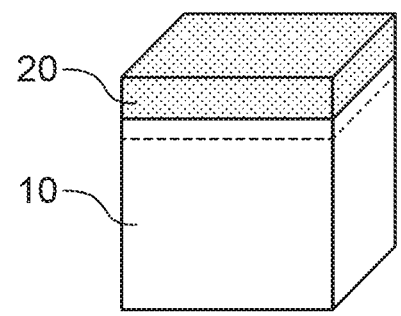

As represented on FIGS. 1A and 1B, the substrate 10 is covered by a surface layer 20. A surface layer 20 means that the substrate 10 is covered by a layer that can be partially or completely oxidised and/or carburized/decarburized and/or that can contain pollutants. Furthermore, according to this invention, the surface layer 20 can have the same chemical nature as the volume of the substrate 10.

The surface layer 20 covering the substrate 10 supplied in step a) does not require a particular surface condition and/or a particular preparation step. A standard state of cleanliness is sufficient, and similarly for oxidation, a standard state without pitting is sufficient The surface of the surface layer 20 can be rough or smooth. The substrate 10 can be directly derived from an as-cast, hot or cold rolled, stretched, hot or cold forged material or it may have been subjected to a surface preparation step, for example it may have been chemically or mechanically polished. These preliminary forming or preparation methods are not exhaustive.

From a general point of view, the surface layer 20 may be in any state because this layer will be removed in step b).

Figure 2:
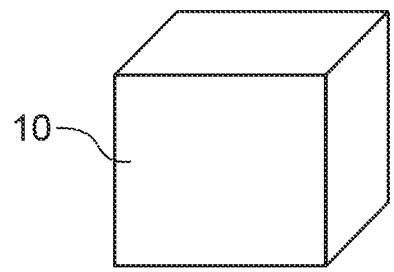

Subtraction of the Thin Surface Layer From the Substrate 10:

The surface layer 20 covering the substrate 10 is removed during step b) (FIG. 2).

Part of the substrate 10 can also be removed, in addition to the surface layer 20 (for example, by removing the surface layer and the external part of the substrate, represented by the dashed lines on FIG. 1B).

The subtraction step can remove pollutants, oxides and/or carbides that can cover the substrate 10.

The quantity of material to be removed to reach the native material of the substrate 10 will depend on the surface condition of the substrate 10. It will preferably be between 0.05 mm and 3 mm, and even more preferably between 0.1 mm and 1 mm.

The thickness of removed material is advantageously identical or substantially identical at all points on the substrate 10.

Subtraction of material may be mechanical and obtained by friction, shear, tearing, etc.

An man skilled in the art will choose a subtraction method capable of simultaneously:

i. removing the surface layer 20 from the surface until reaching the native material of the substrate 10,
ii. reaching a level of microstrains (Lorentz approximation) of more than $1.0 \times 10^{-3}$, preferably more than $1.5 \times 10^{-3}$ and even more preferably more than $3.0 \times 10^{-3}$; for example, the level of microstrains can be as high as $6.6 \times 10^{-3}$ or even higher values depending on the chosen subtraction method and/or the yield strength of the steel or the super alloy. The level of microstrains is sufficient to enable the creation of a lattice of dislocations sufficient for the fast diffusion of the chromium element towards the surface of the substrate 10;
iii. reaching a minimum temperature at the surface of the substrate 10, for example equal to 400° C. and preferably between 500° C. and 900° C., the temperature necessarily being reached instantaneously or at least substantially instantaneously by local heating at a heating rate greater than or equal to 400° C./s, and preferably between 400° C./s and 900° C./s.

"Local heating" means heating at the location at which the surface layer is removed, and substantially instantaneously with said removal.

Figure 3:
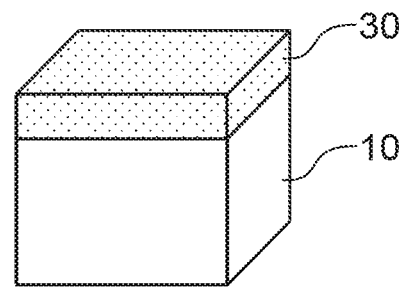

Conditions i), ii), iii) can be combined to obtain the required single-phase oxide layer 30 (FIG. 3).

Concerning point ii), depending on the composition of the substrate 10, the chromium element will be more or less present in the matrix and therefore the density of the necessary dislocations lattice will not be the same. The man skilled in the art will choose the dislocation level as a function of the percentage by mass of chromium in the substrate 10.

The microstrain level can be determined by X-ray diffraction (XRD).

Figure 4A:
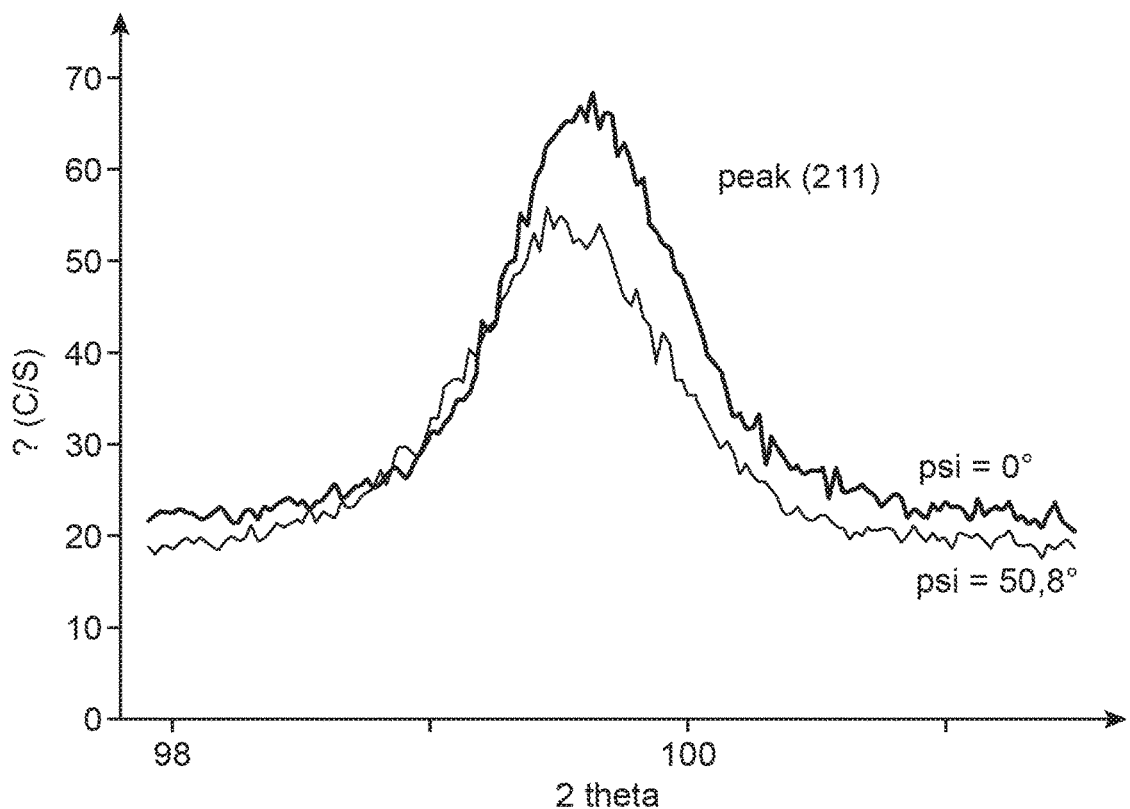
FIGS. 4A and 4B are X-ray diffractograms obtained along the axis and on the circumference of a steel tube respectively, and on which a material subtraction step has been performed according to one particular embodiment of the invention.
Figure 4B:
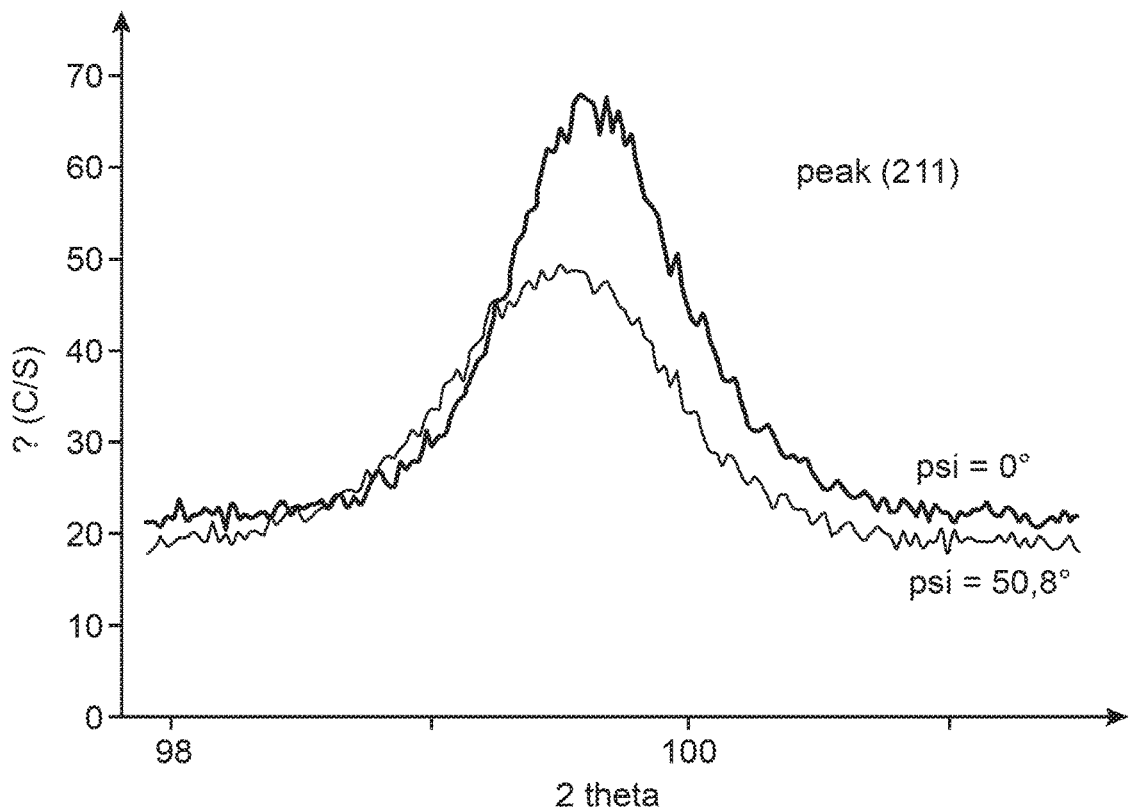

FIGS. 4A and 4B represent diffractograms (Co-Kα) of a T91 steel tube (X10CrMoVNb9-1) prepared by a method according to one embodiment of the invention, at the axis of the tube and the circumference of the tube, respectively.

The substrate 10 obtained after step b), is in biaxial tension. It has an axial stress σ11=270 MPa, a circumferential stress σ22=320 MPa and an average microstrain (Lorentz approximation) equal to: $<\varepsilon>=3.1 \times 10^{-3}$. A widening of the peak is observed related to the formation of microstrains at the surface of the substrate 10. The microstrains were measured on depths varying from 2 to 17 μm, perpendicular to the surface of the substrate 10.

Concerning point iii), the chosen subtraction method performed under air delivers a high strain power locally on the surface that is converted into heat and causes large temperature variations. These are both variations relative to time (very fast heating under the subtraction means and very fast cooling after passage of the tool) and gradients relative to the space (hot surface on cold substrate 10). This fast passage at high surface temperature enables nucleation of the oxide. The cooling temperature gradient shall be equal to or more than 100° C./s over the 900° C./400° C. range.

The method is applied under a dry atmosphere.

The temperature at the substrate/subtraction means interface could possibly be regulated by means of dry air at a low partial $H_2O$ pressure less than 20,000 ppm, preferably less than 500 ppm and even more preferably less than 3 ppm. It has been observed that the use of a water-based cooling fluid will have a negative effect on formation of the oxide.

Preferably, the subtraction step is done at a temperature less than 400° C.

The material subtraction step is done under an oxidising atmosphere (under air or under any other atmosphere containing at least 0.2 atm of dioxygen) to instantaneously create on the surface of the substrate 10 a thin layer of a rhombohedral oxide rich in Cr $(Cr_xFe_{1-x})_2O_3$ (in which x is between 0 and 0.2; for example x=0.1) with nanometric thickness. This oxide is also denoted $(Cr, Fe)_2O_3$.

The oxide formed is in compression. The volume of the oxide is larger than the substrate 10 from which it is formed. Since its lateral extension is restricted by the substrate 10, it is in compression. This point contributes to the protective nature of the layer by reducing diffusion coefficients within it.

The surface of the substrate 10 on which the material subtraction step was performed satisfying criteria i, ii) and iii), under a dry oxidising atmosphere, is in a residual tension stresses condition. Schematically, this corresponds to the formation of a hot "skin" formed during subtraction of material, contracting in contact with a substrate 10 that remained cold in depth.

On the contrary, surfaces subjected to a polishing step are subject to residual compression stresses and the required oxide cannot be formed in them. Similarly, a hot or cold rolling, grinding, electro polishing or electroerosion step, or a SMAT method cannot simultaneously obtain the required microstrain and heating levels. The oxide obtained with such methods will not be a mixed iron and chromium oxide and/or will not be a single-phase oxide and/or will not have the required final thickness. Therefore it will not have the required optical and/or thermal stability properties.

The material subtraction step may be chosen by a man skilled in the art, for example from among abrasive machining, drilling, milling, turning or any other means of obtaining the three simultaneous conditions i, ii), iii).

For example, depending on the application, the man skilled in the art can start from a plane substrate made of X10CrMoVNb9-1 type steel in any state. He can use an electric or pneumatic disc grinder and choose the nature of the preferably continuous disc, compatible with the substrate for example using a corundum or diamond base. The disc rotation speed, the contact pressure and the longitudinal and transverse movements to be applied will be chosen to be able to satisfy criteria i, ii), iii). The application may be such that continuity is achieved on the surface of the substrate. Furthermore, to satisfy oxidation conditions, implementation will take place under a controlled atmosphere satisfying the requirements defined above. The application of an arbitrary tool movement in an arbitrary atmosphere cannot result in a thin, continuous and conforming oxide As a non-limitative example, the subtraction step respecting criteria i), ii) and iii), can be implemented on an $X_{10}CrMoVNb_{9-1}$ type steel substrate, particularly in the form of a piece of flat steel. The initial state of the steel substrate is not very important. In other words, the steel substrate can be as is following hot or cold transformations, or it may have been subjected to at least one preparation. The subtraction step then comprises the application of a contact pressure on the steel substrate by means of an electric or pneumatic disc grinder (for example a portable electric disc grinder). The man skilled in the art is capable of choosing the disc of the disc grinder. The chosen disc is preferably continuous (in other words it has no notches) and is compatible with the nature of the steel substrate. In particular, the disc can be diamond-based or preferably corundum-based.

The maximum peripheral speed of the disc can be determined as a function of the diameter, the nature and the rotation speed of said disc. For example, a maximum peripheral speed of 80 m·s$^{-1}$ may be imposed on a 125 mm diameter AS 30 S INOX BF type disc.

During the subtraction step, the pressure and the contact angle of the disc relative to the surface of the steel substrate are adapted to be able to satisfy safety requirements and to be conforming with standard practice regarding general use of this equipment.

Finally, to satisfy oxidation conditions, implementation may be done under a controlled atmosphere satisfying the previously defined requirements (for example dry air with low $H_2O$ partial pressure less than 20,000 ppm, preferably less than 500 ppm and even more preferably less than 3 ppm).

Growth of the Oxide Layer 30 $(Cr, Fe)_2O_3$:

During step c), a heat treatment is performed to force growth of the oxide layer 30 previously formed in step b). The heat treatment temperature is between 400° C. and 1000° C., and preferably between 400° C. and 850° C. The man skilled in the art will choose the temperature as a function of the composition of the substrate 10. The duration of the heat treatment depends on the geometry of the substrate 10 and the thickness of the oxide layer 30 formed during step b). The duration may for example be between 5 s and 2 h, and preferably between 1 minute and 60 minutes.

The heat treatment is done under a dry air atmosphere or an atmosphere containing a partial $H_2O$ pressure of less than 10,000 ppm, for example between 1 ppm and 10,000 ppm, and preferably less than 600 ppm, for example between 1 ppm and 600 ppm, even more preferably less than 500 ppm, for example between 1 ppm and 500 ppm.

At the end of step c), the thickness of the mixed iron and chromium oxide layer 30 of the $(Fe,Cr)_2O_3$ type of rhombohedral type is from 70 nm to 150 nm, and preferably from 80 nm to 120 nm, for example of the order of 100 nm.

It has been observed that the thickness of single-phase oxide formed at the end of step c), tended towards a maximum of the order of 150 nm independently of the heat treatment duration and temperature. On the contrary, the thicknesses of non-single-phase oxide layers can be up to more than 400 nm.

Mechanical stresses in the material can be relaxed in step c).

The substrate 10 obtained by the previously described method will be covered by a stable oxide layer 30. There are no layers intercalated between the steel substrate 10 and the oxide layer 30. The oxide layer 30 has intrinsic optical selectivity properties, in other words high solar absorbance and low emittance.

The substrate 10 obtained by the previously described method can for example be used to make a solar absorber that has improved selectivity properties compared with solar absorbers obtained by techniques known in prior art.

In particular and for comparison purposes, the inventors have determined the properties of an absorber obtained using a method known in prior art and an absorber obtained using the method according to this invention.

In both cases, the surface of a substrate made of T91 (X10CrMoVNb9-1) type steel was oxidised.

Figure 7:
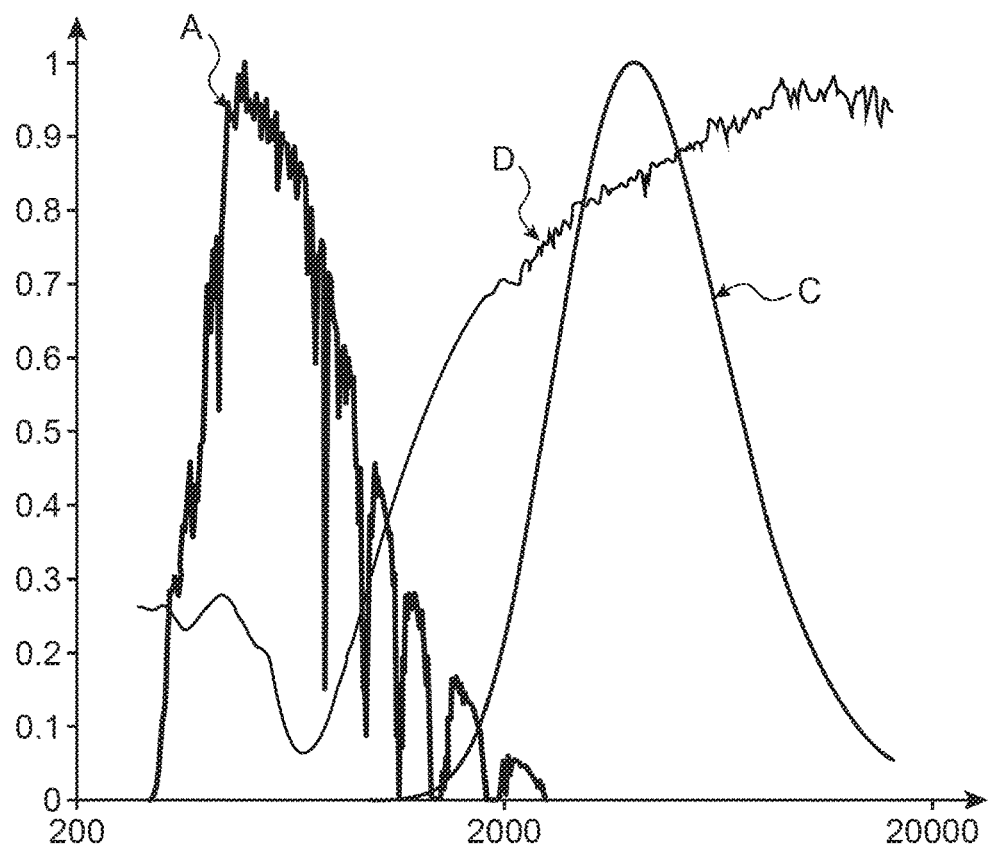
FIG. 7 is a graphic representation of the spectral performances of a type T91 absorber polished and oxidised according to the method described in document [4] mentioned at the end of the description, in particular curve D represents the reflectance of said absorber (vertical axis, in arbitrary units) as a function of the wavelength, and curves A and C are the same as those in FIG. 6.

In this regard, FIG. 7 reproduces a curve showing hemispherical reflectance of a T91 substrate (X10CrMoVNb9-1) (called the "known sample") polished and oxidised at 600° C. for 1 h prepared according to the method described in document [4] mentioned at the end of the description.

Figure 8:
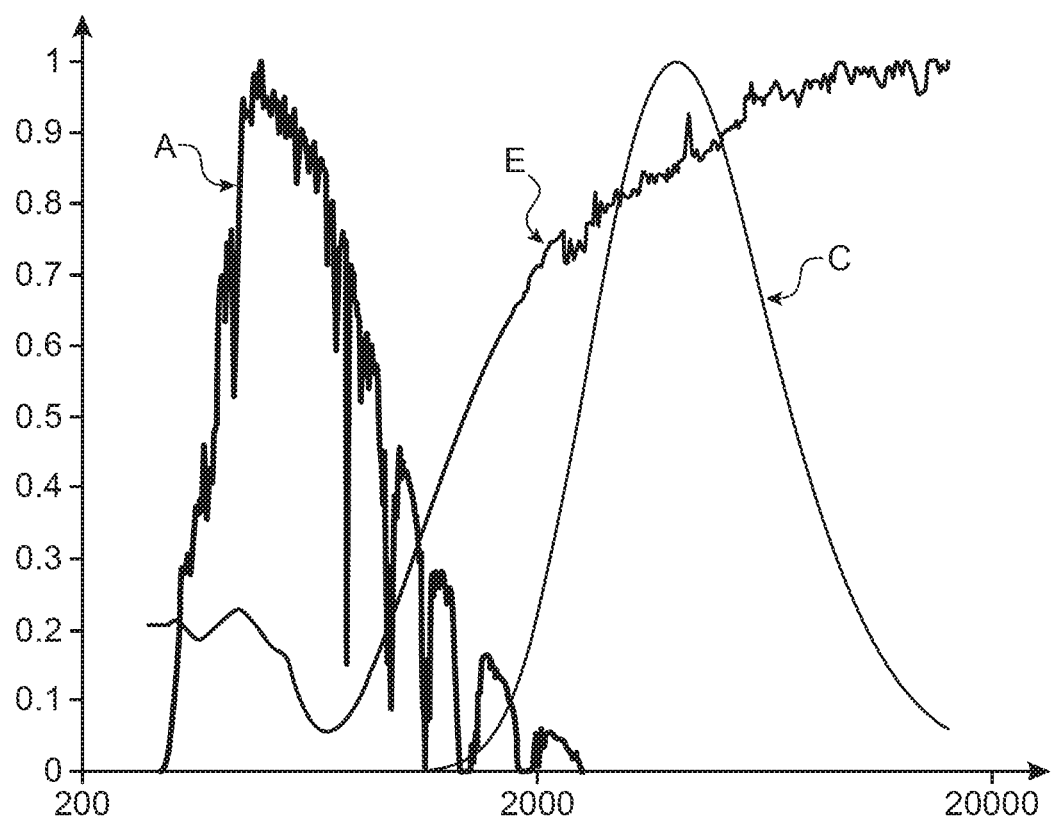
FIG. 8 is a graphic representation of the spectral performances of a type T91 absorber polished and oxidised according to the method according to this invention, in particular curve E represents the reflectance of said absorber (vertical axis, in arbitrary units) as a function of the wavelength, and curves A and C are the same as those in FIG. 6.

FIG. 8 represents the hemispherical reflectance curve for a T91 substrate (X10CrMoVNb9-1) (called the "inventive sample" prepared according to the invention and oxidised under the same conditions.

The reflectance curves obtained for the known sample and for the inventive sample can be used to calculate values of the solar absorbance ($\alpha$) and emittance ($\varepsilon$) at 100° C., 300° C. and 450° C. for each of the two samples. The method used for these calculations is presented in the "Appendix" section of this invention.

Thus, table 1 contains the absorbance and emittance properties for the known sample, and table 2 contains the properties for the inventive sample.

TABLE 1

| $\alpha$ | $\varepsilon$ (100° C.) | $\varepsilon$ (300° C.) | $\varepsilon$ (450° C.) |
|---|---|---|---|
| 73.17 | 6.47 | 9.50 | 11.91 |

TABLE 2

| $\alpha$ | $\varepsilon$ (100° C.) | $\varepsilon$ (300° C.) | $\varepsilon$ (450° C.) |
|---|---|---|---|
| 77.70 | 2.30 | 3.42 | 6.89 |

Comparing the values in the two tables, it can be seen that for the same type of sample, in this case T91 (X10CrMoVNb9-1), the method according to the invention can obtain a tube with a higher level of solar absorbance equal to 77.70% instead of 73.17% while having a lower emittance level of 6.89% at 450° C. compared with 11.91%.

Figure 5:
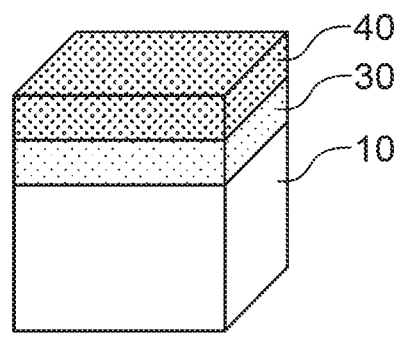
FIG. 5 is a three-dimensional schematic view representing a substrate covered by an intrinsically selective oxide layer obtained by the method according to the invention, and by an anti-reflection layer according to one particular embodiment.

The selectivity of the absorber can be improved by adding one or several anti-reflection layers 40 deposited a posteriori on the oxide layer 30 (FIG. 5), or even absorbent layers. The thickness and the nature of the layer or of the layers will depend on the required anti-reflection properties and can easily be calculated using an optical simulation tool. The SCOUT optical simulation program (downloadable from the internet site www.mtheiss.com) used by research teams working on the multi-layer deposition of selective solar absorbers, can be mentioned for illustrative purposes.

The solar absorber fabricated using the method according to the invention is oriented particularly for medium or even high temperatures (thermodynamic concentrating solar power station).

The substrate 10 can also be used to make the sensitive part of a flux sensor, or a temperature sensor under irradiation.

The substrate 10 can also be used for temperature applications under air (lower than the working temperature of the substrate 10), or for applications requiring increased protection against hot oxidation.

For example, the working temperature of a T91 (X10CrMoVNb9-1) steel is about 650° C.

Illustrative and Non-Limitative Examples of One Embodiment:

The method was used on a steel substrate 10 containing about 9.5% of Cr (T91 (X10CrMoVNb9-1)). In particular, the substrate 10 was oxidised at 650° C. for an hour under dry air so as to form the protective layer 30 on the surface of the substrate 10. The layer 30 thus formed is a 90 nm thick layer of (Fe, Cr)$_2$O$_3$. An SiO$_2$ anti-reflection layer was also deposited on a part of the substrate 10 (called part "I") leaving another part of the sample (called part "II") without an anti-reflection layer.

The single-phase nature of the oxide layer is verified by X-ray diffraction. The equipment used is a Bruker diffractometer (model: D8 Advance) equipped with a Cu source and a LynxEye type linear detector. The power supply voltage and current of the X-ray type are 40 kV and 40 mA respectively. The beam width is 12 mm, and its divergence is 0.45°. Under these conditions, the only phase detected in the oxide is rhombohedral (Fe,Cr)$_2$O$_3$, confirming the single-phase nature of the oxide layer.

Figure 9:
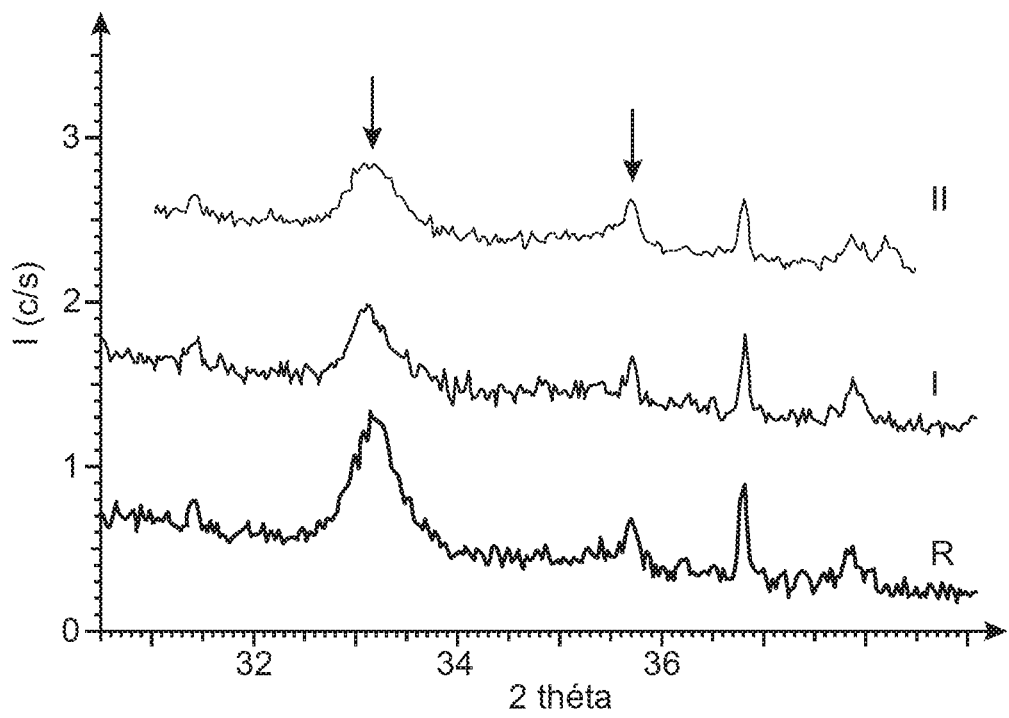
FIG. 9 represents diffractograms obtained on a sample prepared according to the method according to this invention, before exposure (diffractogram "R"), after 3000 hours of exposure at 500° C. and under air, respectively, in part I (diffractogram "I"), and in part II (diffractogram "II")

A substrate 10 and its protective oxide layer 30 obtained by the method according to the invention was tested under working conditions (500° C. in air), and in particular was subjected to an exposure of 3000 hours at 500° C. under air. In this regard, FIG. 9 represents diffractograms obtained on the sample before exposure (diffractogram "R"), after 3000 hours of exposure at 500° C. and under air, respectively, in part I (diffractogram "I"), and in part II (diffractogram "II").

On each of these three diffractograms, the arrows indicate representative peaks of the oxide layer (Fe, Cr)$_2$O$_3$. No significant variation of these peaks is detected, thus confirming an excellent stability of the oxide layer. Therefore these results confirm that the substrate 10 is protected from oxidation.

The inventors have also measured the variation of optical properties, particularly the solar absorbance and emittance at 450° C., during 3000 hours of ageing at 500° C. under air.

Figure 10A:
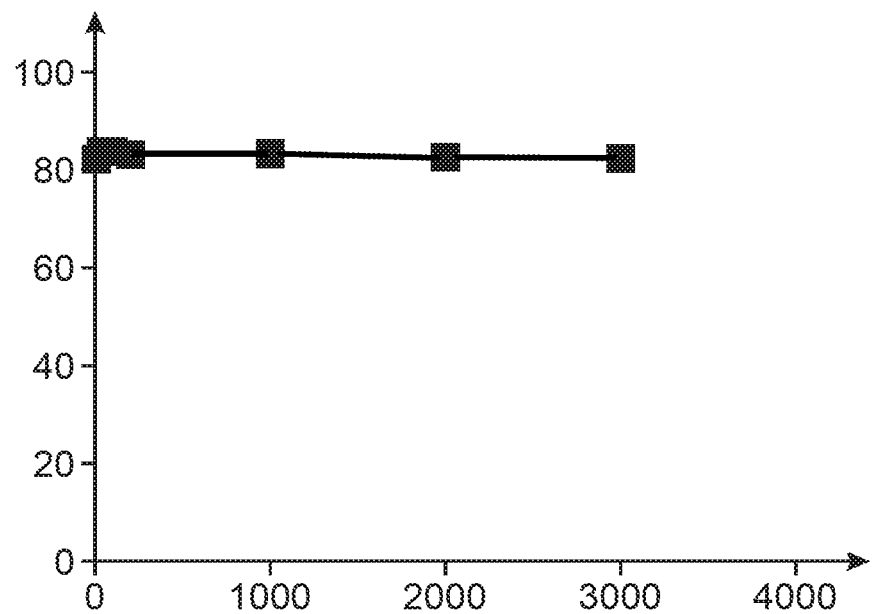
FIGS. 10a and 10b are graphic representations of the variation of solar absorbance and emittance at 450° C. respectively (vertical axis in percent) as a function of the exposure time (horizontal axis in hours) of an oxide substrate using the method according to this invention.
Figure 10B:
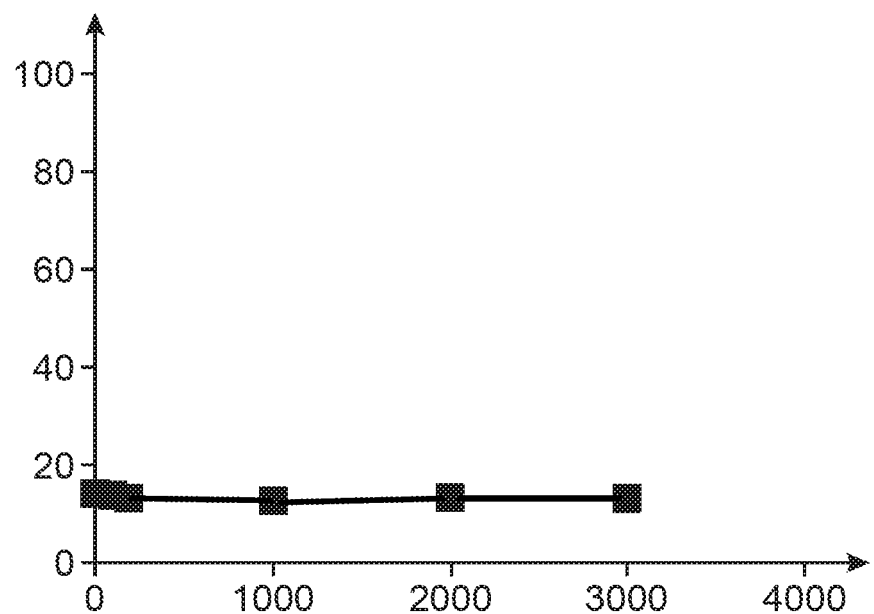

The results obtained are assembled on FIGS. 10a and 10b that represent the variation of the solar absorbance and emittance at 450° C. respectively (vertical axis in percent) as a function of the exposure time (horizontal axis in hours). These two magnitudes remain relatively constant during exposure, this demonstrating an excellent stability of the optical properties of the samples thus tested.

The stability of the optical properties and the oxide layer measured by X-ray diffraction shows the excellent resistance to oxidation under air at 500° C. of the samples relative to the samples in documents [5] and [6] mentioned at the end of the description.

APPENDIX

"Absorbance" means a coefficient of absorption of an electromagnetic wave by a body. In this case, the solar absorbance corresponds to the absorption coefficient of the solar spectrum by the material, and particularly the oxide layer 30. It is calculated from the measured reflectance spectrum of a spectrophotometer and the solar spectrum.

"Emittance" means the percentage of radiation flux emitted in all directions by a material, particularly the oxide layer 30, at a given temperature T relative to the radiation flux in all directions from the black body at this same temperature (it is understood that a black body has an emittance of 100%).

"Reflectance" or "total reflectance" means the proportion of light flux reflected by a surface as a function of an incident flux on said surface. Reflectance is total when it is measured in all directions using an integration sphere. The reflectance spectrum gives the reflectance as a function of the wavelength.

The measurement of the total reflectance spectrum can be used to calculate the solar absorbance $\alpha$ and the emittance $\varepsilon_T$ at a temperature T. In this description, it is assumed that Kirchhoff's law is applicable since the material is opaque (The man skilled in the art can consult documents [1] and [2] mentioned at the end of the description), such that $\varepsilon(\lambda; \theta, \phi) = \alpha(\lambda; \theta, \phi)$ (1).

If the total measurement (on the entire space) and for an opaque material without any non-linear effect (that is generally accepted for solar absorbers), the total emittance and the total reflectance are related by the relation $\varepsilon_T(\lambda) = 1 - \rho_T(\lambda)$ (2).

Thus, the solar absorptance and the emittance at temperature T are defined by the following relations:

$$\alpha = 1 - \frac{\int_{\lambda=280nm}^{2500nm} \rho_T(\lambda) \times S(\lambda) d\lambda}{\int_{\lambda=280nm}^{2500nm} S(\lambda) d\lambda} \quad (3)$$

$$\varepsilon(T) = 1 - \frac{\int_{\lambda=280\ nm}^{16\,000\ nm} \rho_T(\lambda) \times B_T(\lambda) d\lambda}{\int_{\lambda=280\ nm}^{16\,000\ nm} B_T(\lambda) d\lambda} \quad (4)$$

wherein:
α: total solar absorptance
ε(T): emittance at temperature T
$\rho_T(\lambda)$: total reflectance at wavelength λ
$B_T(\lambda)$: Irradiance of the black body at temperature T and at wavelength λ
S(λ): Solar irradiance at wavelength λ
λ: wavelength The measurement procedure is described in the paper by J. Braillon et al. [3] mentioned at the end of the description.

Figure 6:
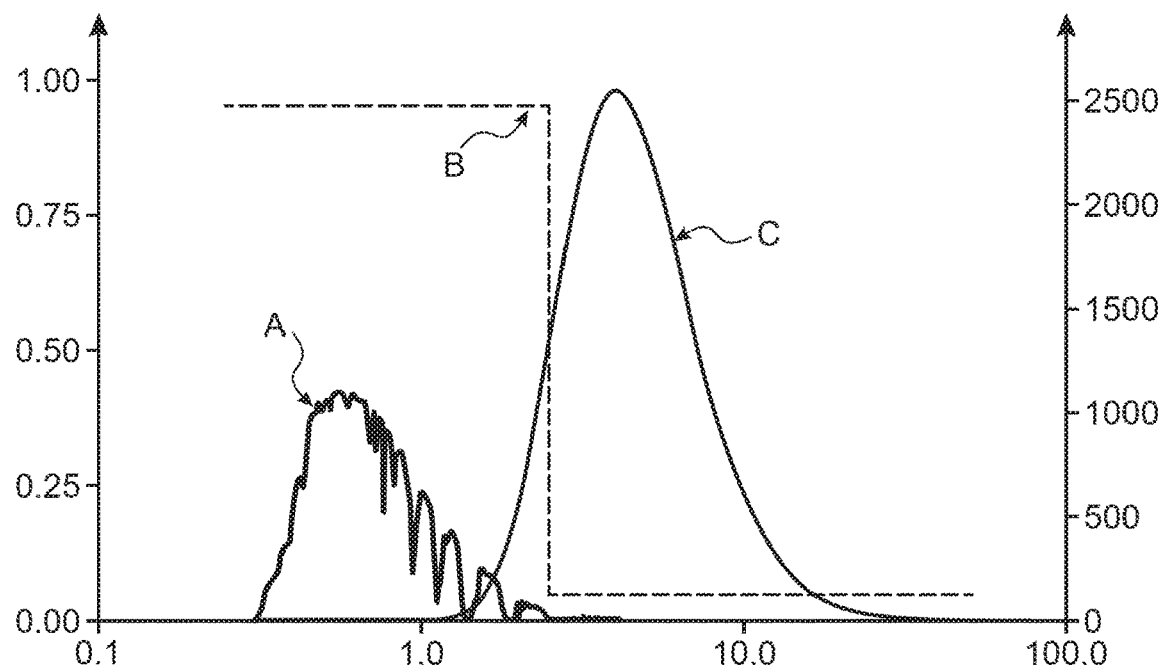
FIG. 6 is a graphic representation of the spectral performances of a selective solar absorber, particularly curve B is a graphic representation of the absorbance or the emittance (left vertical axis, in arbitrary units) and the irradiance (right vertical axis, in arbitrary units) as a function of the wavelength (horizontal axis in μm) of a selective solar absorber, curve A represents the solar spectrum and curve C the radiation from a black body at 450° C.

A solar absorber is said to be selective if it has strong solar absorbance and low emittance at the working temperature. The ideal curve for such a material is given in the paper by C. Kennedy [1] mentioned at the end of the description, and reproduced in FIG. 6.

REFERENCES

[1] C. Kennedy, "*Review of mid- to high-temperature solar selective absorber materials*," Tech. Rep. NREL/TP-520-31267, NREL, National Renewable Energy Laboratory 1617 Cole Boulevard Golden, Colorado 80401-3393, 2002;

[2] J. Palmer, *Handbook of Optics, second ed., Part II,*, ch. 25, The Measurement of Transmission, Absorption, Emission and Reflection. M. Bass, 1994;

[3] J. Braillon et al., Development of optical tool for the characterization of selective solar absorber tubes, AIP Conference Proceedings 1734, 130004 (2016);

[4] FR2976349;

[5] O. Raccurt et al., "*Study of the stability of a selective solar absorber coating under air and high temperature conditions*", Energy Procedia, Vol. 69, 2015, p 1551-1557;

[6] Raccurt, O. et al., "*In air durability study of solar selective coating for parabolic trough technology*", (2017), AIP Conference Proceedings 1850(1), 130010.

The invention claimed is:

1. A method for forming a layer of single-phase oxide (Fe, Cr)$_2$O$_3$ with a rhombohedral structure on a steel or super alloy substrate, the method comprising:
   (a) removing a surface layer of a substrate of steel or super alloy covered by the surface layer, the steel or super alloy comprising iron and at least 2% by weight of chromium, to reach the substrate, in a subtraction, under an atmosphere containing at least 0.2 atm of dioxygen, the subtraction generating a level of microstrains in a steel or super alloy crystalline lattice of the substrate larger than $1.0 \times 10^{-3}$ and locally heating at a rate of more than 400° C./s, so as to form a single-phase rhombohedral oxide (Fe, Cr)$_2$O$_3$ layer; and
   (b) heat treating, under air at a partial water pressure of less than 10,000 ppm, and at a temperature in a range of from 400° C. to 1000° C., so as to grow the single-phase rhombohedral oxide (Fe, Cr)$_2$O$_3$ layer formed in the removing (a) to a thickness in a range of from 70 nm to 150 nm.

2. The method of claim 1, wherein the subtraction in the removing (a) is a mechanical subtraction done at a temperature in a range of from −10° C. to 400° C.

3. The method of claim 2, wherein the steel or super alloy comprises the chromium in a range of from 2 to 25% by weight.

4. The method of claim 1, wherein the subtraction in the removing (a) is a mechanical subtraction done at a temperature in a range of from −10° C. to 100° C.

5. The method of claim 1, wherein a water content during the removing (a) is less than 20,000 ppm.

6. The method of claim 1, wherein a water content during the removing (a) is less than 500 ppm.

7. The method of claim 1, wherein a water content during the removing (a) is less than 3 ppm.

8. The method of claim 1, wherein the level of microstrains generated in the steel or super alloy crystalline lattice in the removing (a) is more than $1.5 \times 10^{-3}$.

9. The method of claim 1, wherein the level of microstrains generated in the steel or super alloy crystalline lattice in the removing (a) is more than $3 \times 10^{-3}$.

10. The method of claim 1, wherein the rate of the locally heating in the subtraction is in a range of from more than 400 to 900° C./s.

11. The method of claim 1, wherein the heat treating (b) is applied for a duration in a range of from 5 s to 2 h.

12. The method of claim 1, wherein the heat treating (b) is applied for a duration in a range of from 1 minute to 60 minutes.

13. The method of claim 1, wherein a partial water pressure during the heat treating (b) is less than 600 ppm.

14. The method of claim 1, wherein a partial water pressure during the heat treating (b) is less than 500 ppm.

15. The method of claim 1, wherein the thickness of the single-phase rhombohedral oxide (Fe, Cr)$_2$O$_3$ layer obtained in the heat treating (b) is in a range of from 80 to 120 nm.

16. The method according to claim 1, wherein the chromium is present in the steel or super alloy in a range of from 2 to 25% by weight.

17. The method of claim 1, wherein the chromium is present in the steel or super alloy in a range of from 5 to 16% by weight.

18. The method of claim 1, wherein the steel or super alloy comprises the chromium in a range of from 2 to 20% by weight.

19. A method for fabricating a solar absorber, the method comprising:
   forming the single-phase rhombohedral oxide (Fe, Cr)$_2$O$_3$ layer on the steel or super alloy substrate, by the method of claim 14; and
   applying an anti-reflection layer on the single-phase rhombohedral oxide (Fe, Cr)$_2$O$_3$ layer.

20. A solar absorber obtained by the method of claim 19, comprising, in sequence:
   the steel or super alloy substrate;
   the single-phase rhombohedral oxide (Fe, Cr)$_2$O$_3$ layer with a thickness in a range of from 70 nm to 150 nm, covering the steel or super alloy substrate; and
   the anti-reflection layer.

21. The solar absorber of claim 20, wherein the thickness of the single-phase rhombohedral oxide (Fe, Cr)$_2$O$_3$ layer is in a range of from 80 nm to 120 nm.

* * * * *